(12) United States Patent
di Girolamo et al.

(10) Patent No.: US 10,132,341 B2
(45) Date of Patent: Nov. 20, 2018

(54) CONNECTOR SYSTEMS, ASSEMBLIES, AND METHODS

(71) Applicant: The Steel Network, Inc., Durham, NC (US)

(72) Inventors: Edward R. di Girolamo, Raleigh, NC (US); James E. Herrmann, Raleigh, NC (US)

(73) Assignee: The Steel Network, Inc., Durham, NC (US)

( * ) Notice: Subject to any disclaimer, the term of this patent is extended or adjusted under 35 U.S.C. 154(b) by 96 days.

(21) Appl. No.: 15/235,628

(22) Filed: Aug. 12, 2016

(65) Prior Publication Data

US 2017/0044787 A1    Feb. 16, 2017

Related U.S. Application Data

(60) Provisional application No. 62/204,841, filed on Aug. 13, 2015.

(51) Int. Cl.
*F16B 5/02* (2006.01)

(52) U.S. Cl.
CPC ................. *F16B 5/0225* (2013.01)

(58) Field of Classification Search
CPC ..... E04B 1/38; E04B 1/40; E04B 1/98; E04B 2001/2415; E04B 2001/2439; E04B 2/768; F16B 43/00; Y10T 403/11; B21D 28/26
See application file for complete search history.

(56) References Cited

U.S. PATENT DOCUMENTS

| | | | | |
|---|---|---|---|---|
| 3,354,689 A | * | 11/1967 | Tirone | ........................ B21J 9/06 |
| | | | | 72/334 |
| 4,048,835 A | * | 9/1977 | Giger | ..................... B21D 28/24 |
| | | | | 29/896.3 |
| 4,060,905 A | * | 12/1977 | Light | ....................... G01B 3/04 |
| | | | | 248/542 |
| 5,313,752 A | | 5/1994 | Hatzinikolas | |
| 5,467,566 A | | 11/1995 | Swartz et al. | |
| 5,606,888 A | * | 3/1997 | Grabbe | .................. B21D 19/08 |
| | | | | 72/355.4 |
| 5,846,018 A | | 12/1998 | Frobosilo et al. | |
| 5,876,006 A | | 3/1999 | Sharp et al. | |

(Continued)

FOREIGN PATENT DOCUMENTS

WO    WO 2017/027794 A1    2/2017

OTHER PUBLICATIONS

Official Action corresponding to U.S. Appl. No. 15/088,672 dated May 18, 2017.

(Continued)

*Primary Examiner* — Christine T Cajilig
(74) *Attorney, Agent, or Firm* — Jenkins, Wilson, Taylor & Hunt, P.A.

(57) ABSTRACT

The present subject matter relates to systems, assemblies, and methods for connecting vertical steel wall studs to a building structure. In particular, a connecting member for use in building assembly can include a substantially rigid plate having one or more elongated slots formed therein and a bushing coupled to the plate at an initial position within each of the one or more slots but movable relative to the plate within a respective one of the one or more slots upon application of a force exceeding a predetermined threshold value.

13 Claims, 6 Drawing Sheets

(56) References Cited

U.S. PATENT DOCUMENTS

| | | |
|---|---|---|
| 5,906,080 A | 5/1999 | diGirolamo et al. |
| 6,213,679 B1 | 4/2001 | Frobosilo et al. |
| 6,612,087 B2 | 9/2003 | diGirolamo et al. |
| 7,479,508 B2 | 1/2009 | Embil et al. |
| 7,503,150 B1 | 3/2009 | diGirolamo et al. |
| 8,181,419 B1 | 5/2012 | diGirolamo |
| 8,683,770 B2 | 4/2014 | diGirolamo et al. |
| 9,651,345 B2 * | 5/2017 | Hartl ................ F42B 3/103 |
| RE46,844 E | 5/2018 | deGirolamo et al. |
| 2002/0023405 A1 * | 2/2002 | Zadeh ............... E04B 1/2403 52/714 |
| 2004/0096266 A1 * | 5/2004 | Birnbaum ........... E04B 1/2403 403/187 |
| 2004/0129051 A1 * | 7/2004 | Akahane ............. B21D 28/24 72/334 |
| 2005/0050935 A1 * | 3/2005 | Miyahara ............ B21D 28/18 72/327 |
| 2006/0032180 A1 * | 2/2006 | Peterson ............... E04B 2/96 52/712 |
| 2007/0113612 A1 * | 5/2007 | Takekoshi ........... B21D 28/26 72/335 |
| 2009/0113839 A1 | 5/2009 | Carr |
| 2012/0266545 A1 | 10/2012 | diGirolamo et al. |

OTHER PUBLICATIONS

Notice of Allowance and Fees Due corresponding to U.S. Appl. No. 13/542,854 (11 pages) dated Jul. 6, 2012.

Notice of Allowance and Fees Due corresponding to U.S. Appl. No. 12/629,979 (9 pages) dated Jan. 30, 2012.

Notification of Transmittal of the International Search Report and the Written Opinion of the International Searching Authority, or the Declaration for International Application No. PCT/US2016/046744 dated Oct. 28, 2016.

Notification Concerning Availabilty of the Publication of the International Application corresponding to International Patent Application No. PCT/US2016/046744 dated Feb. 16, 2017.

Notice of Allowance corresponding to U.S. Appl. No. 15/088,672 dated Jan. 19, 2018.

* cited by examiner

CONNECTOR SYSTEMS, ASSEMBLIES, AND METHODS

PRIORITY CLAIM

The present application claims the benefit of U.S. Patent Application Ser. No. 62/204,841, filed Aug. 13, 2015, the disclosure of which is incorporated herein by reference in its entirety.

TECHNICAL FIELD

The subject matter disclosed herein relates generally to steel stud building systems. More particularly, the subject matter disclosed herein relates to systems, assemblies, and methods for connecting vertical steel wall studs to a building structure in a manner to permit relative vertical movement but prevent relative horizontal movement therebetween.

BACKGROUND

In the construction of buildings which may be subject to deflection (e.g., due to wind or seismic forces), it can be desirable to allow a degree of freedom of movement to reduce stress and possible fracture of connected parts. Specifically, for example, walls such as partition walls that are not intended to support vertical loads (i.e., "curtain walls") can be designed to allow deflection due to changes in live loads, such as deflection of the primary structure of the building (i.e., main supporting components to which secondary members are attached) from wind-induced or seismic stress loading and/or from changes in live or dead loading of the floor below or the ceiling above the curtain wall.

In view of these considerations, it would be desirable for improved vertical deflection connectors to allow relative vertical movement while exhibiting greater strength in restricting relative horizontal movement. It would further be desirable for such connectors to still be readily manufactured and installed.

SUMMARY

In accordance with this disclosure, systems, assemblies, and methods for connecting vertical steel wall studs to a building structure are provided. In one aspect, a connecting member for use in building assembly is provided. The connecting member can comprise a substantially rigid plate having one or more elongated slots formed therein and a bushing coupled to the plate at an initial position within each of the one or more slots but movable relative to the plate within a respective one of the one or more slots upon application of a force exceeding a predetermined threshold value.

In another aspect, a connecting member for use in building assembly comprises a substantially rigid plate having one or more elongated slots formed therein and a bushing coupled to the plate at an initial position within each of the one or more slots by one or more tabs connected to the bushing and to the plate. The bushing can comprise one or more bulges protruding from at least one edge of the bushing towards an edge of a respective one of the one or more slots, each of the one or more bulges being associated with a depression formed in a surface of the bushing. In addition, the bushing can be movable relative to the plate within a respective one of the one or more slots upon application of a force exceeding a predetermined threshold value required to break the one or more tabs.

In yet another aspect, a method of preparing a connecting member for use in building assembly is provided. The method can comprise forming a pair of substantially parallel slits in a metal blank, forming a depression between the substantially parallel slits, forming an elongated slot by removing material beginning from the substantially parallel slits for a predetermined length and width away from the depression, and forming a connector opening through the depression to form a bushing in the blank.

In another aspect, a connecting member for use in building assembly comprises a substantially rigid plate having one or more openings formed therein, the one or more openings being configured for receiving a fastener. An area around the one or more openings is modified by work hardening to improve a strength of the area.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
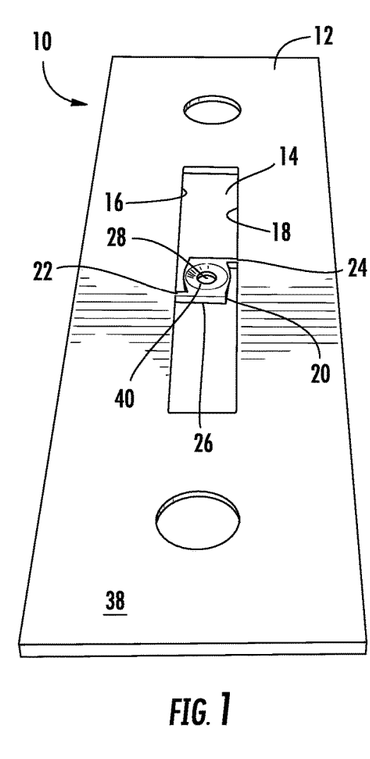
FIGS. 1-3 are perspective views of vertical deflection connectors according to embodiments of the presently disclosed subject matter.
Figure 2:
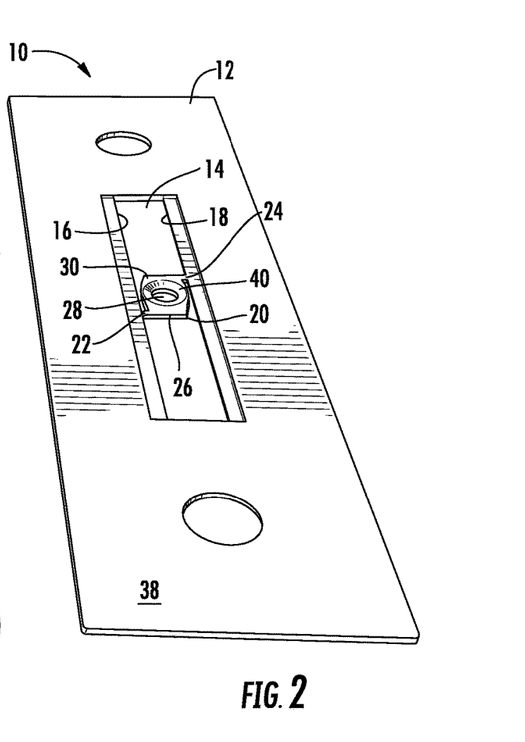

The present subject matter provides systems, assemblies, and methods for connecting vertical steel wall studs to a building structure in a manner to permit relative vertical movement but prevent relative horizontal movement therebetween. In particular, in one aspect, the present subject matter provides a connecting member for use in building assembly (e.g., as a vertical deflection connector). As illustrated in FIGS. 1 and 2, for example, a connector assembly, generally designated 10, can include a substantially rigid plate member 12 (e.g. a steel plate) having an elongated slot 14 formed therein, wherein the elongated slot includes opposed first and second edges 16 and 18 along its longest dimension. One or more additional fastener-receiving openings can also be provided in plate member 12.

Figure 3:
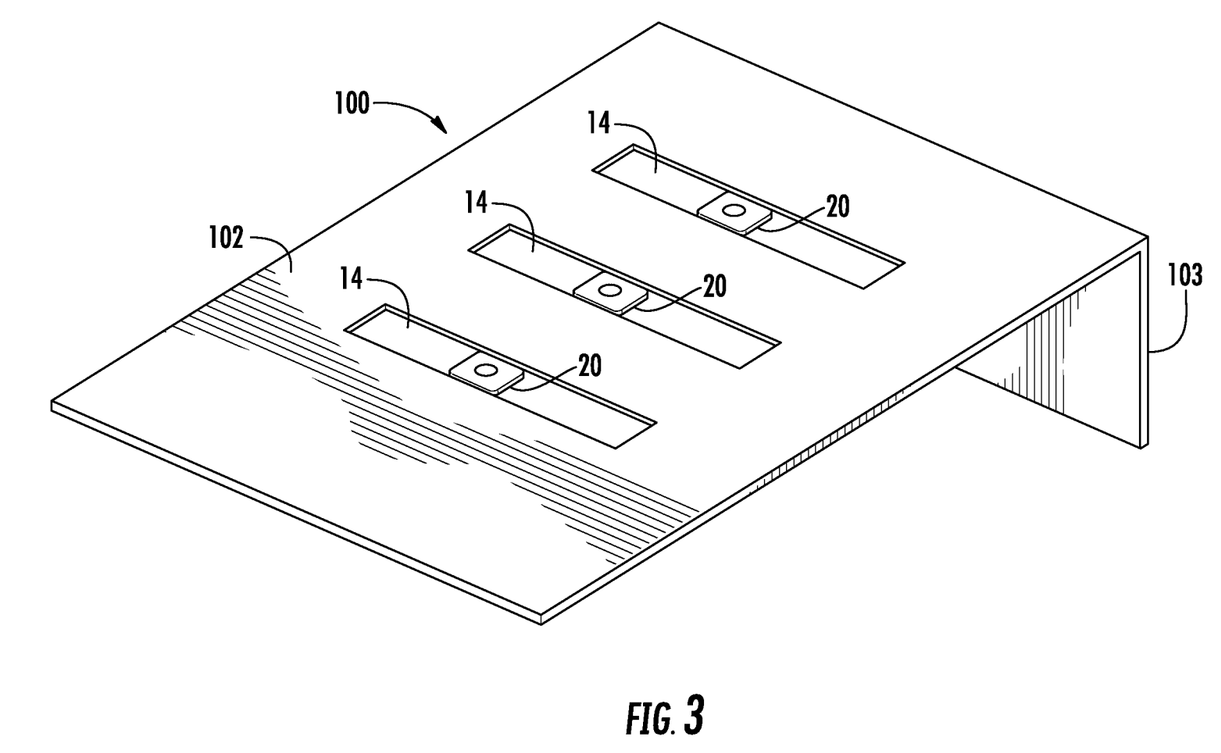

An alternative embodiment is shown in FIG. 3 in which a large connector plate, generally designated 100, similarly comprises a substantially rigid plate member 102 and a flange 103 that extends from an edge of plate member 102. Large connector plate 100 can have a plurality of elongated slots 14 formed therein. Although FIGS. 1-3 show some representative examples of the kinds of configurations that are contemplated by the present disclosure, those having skill in the art will also recognize that the subject matter disclosed herein can be applied to any of a variety of additional configurations.

Regardless of the particular configuration, the connector assemblies disclosed herein can each further include a bushing or washer element associated with each of the elongated slots formed in the substantially rigid plate members. Specifically, for example, referring again to the configuration shown in FIG. 1, a bushing 20 can comprise a main body 26 through which a fastener center opening 28 can be provided. In some embodiments, main body 26 of bushing 20 can include a face 30, which can itself include a depressed area 40 that is substantially concentric with the fastener center opening 28 and is angled from face 30 toward a center of fastener center opening 28. In this arrangement, depressed area 40 is adapted to receive a fastener (not show here) and guide the fastener into fastener center opening 28.

Figure 4A:
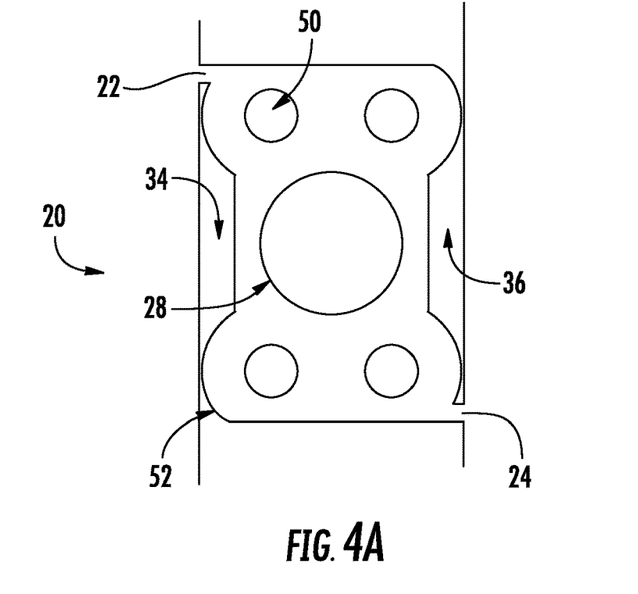
FIGS. 4A and 4B are top views of bushing elements of vertical deflection connectors according to embodiments of the presently disclosed subject matter.

Bushing 20 can be configured to be coupled to plate member 12 at an initial position within slot 14. In particular, in the configuration shown in FIGS. 1 and 2, bushing 20 is coupled with the plate by one or more tabs connected to bushing 20 and to plate member 12. A detailed view of this configuration is shown in FIG. 4A. As shown in FIGS. 1, 2, and 4A, bushing 20 can be connected to plate member 12 by a first tab 22 that projects away from a main body 26 of bushing 20 and connects bushing 20 to first edge 16 of slot 14. Similarly, a second tab 24 can project away from main body 26 of bushing 20 and connect bushing 20 to second edge 18 of slot 14. In the particular configurations shown in FIGS. 1, 2, and 4A, for example, first tab 22 can connect a first corner of bushing 20 to first edge 16 of slot 14, and second tab 24 can connect a diagonally opposing corner of bushing 20 to second edge 18 of slot 14.

Figure 4B:
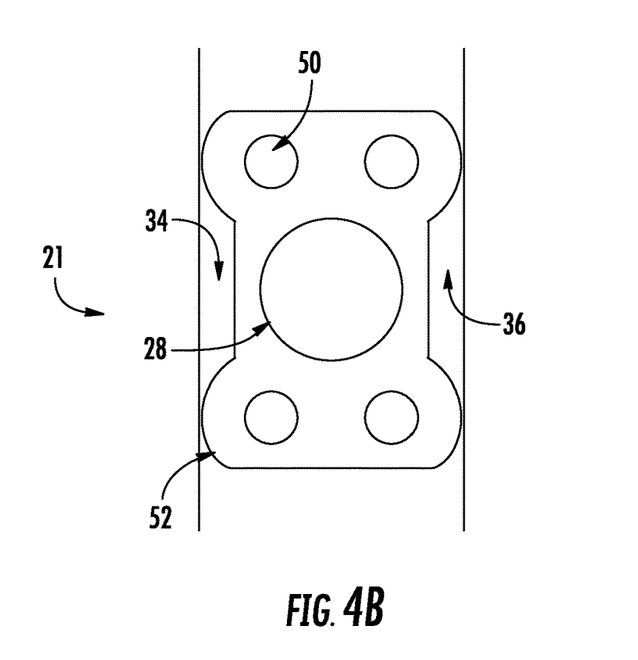

Alternatively, as shown in FIG. 4B, there may be no physical connection between bushing 20 and plate member 12, but bushing 20 can be sized to have a width that is substantially similar to a width of slot 14. In this configuration, although no tabs or other physical connector actually joins bushing 20 to plate member 12, bushing 20 can still be coupled to plate member 12 (e.g., by friction).

In either configuration, bushing 20 can be substantially retained in slot 14 at a desired initial position (e.g., by first and second tabs 22 and 24 or by friction fit), which can allow an installer to position connector assembly 10 in a desired orientation with respect to other building elements to which connector assembly 10 will be coupled without having to separately align bushing 20. As a result, installation of connector assembly 10 can be easier than using conventional connectors.

That being said, connector assembly 10 can further be configured such that bushing 20 is movable relative to plate member 12 within slot 14 upon application of a force exceeding a predetermined threshold value. For example, once connector assembly 10 is installed as part of a partition wall, it can be desirable to allow a degree of freedom of movement to reduce stress and possible fracture of connected parts as discussed above. In this regard, bushing 20 can be designed to be movable from its initial position as needed to allow such movement. Specifically, referring to the embodiments shown in FIGS. 1, 2, and 4A, first and second tabs 22 and 24 can be designed to break when a force that exceeds a designed threshold value is exerted between plate member 12 and bushing 20. Loads that are sufficient to cause bushing 20 to break away can vary based on the material thickness selected for a given application. In some embodiments, for example, bushing 20 is designed to break away under applied loads in the range of 40 pounds for thinner steels (e.g., t=0.03) and up to 200 pounds for heavier steels (e.g., t=0.125). Similarly, referring to the embodiment shown in FIG. 4B, a bushing 20 can be designed to be movable relative to plate member 12 within slot 14 if a force exerted between plate member 12 and bushing 20 exceeds the frictional force that holds bushing 20 in its position in slot 14. In any configuration, the force needed to cause bushing 20 to break away or otherwise become dislodged from its initial attached position is designed to not substantially affect the load-carrying capacity of the member it is supporting horizontally by applying an axial load through the attachment.

Figure 5A:
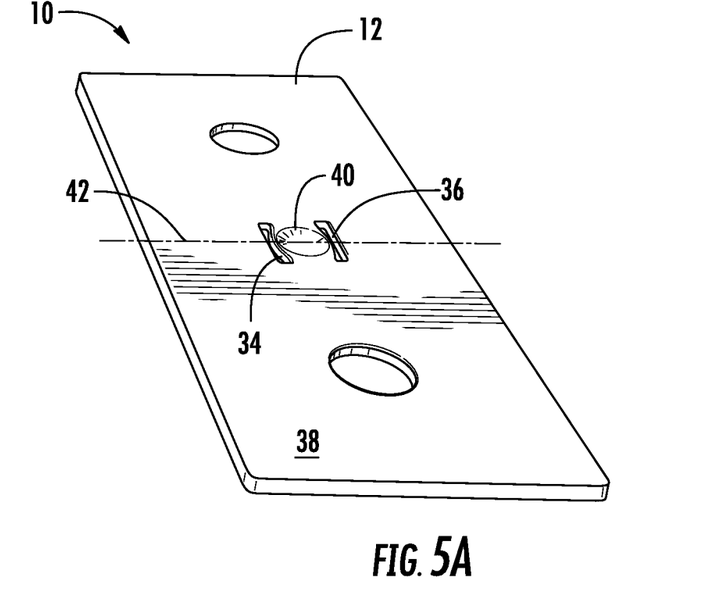
FIGS. 5A and 5B are perspective views of steps in a process for creating vertical deflection connectors according to embodiments of the presently disclosed subject matter.
Figure 5B:
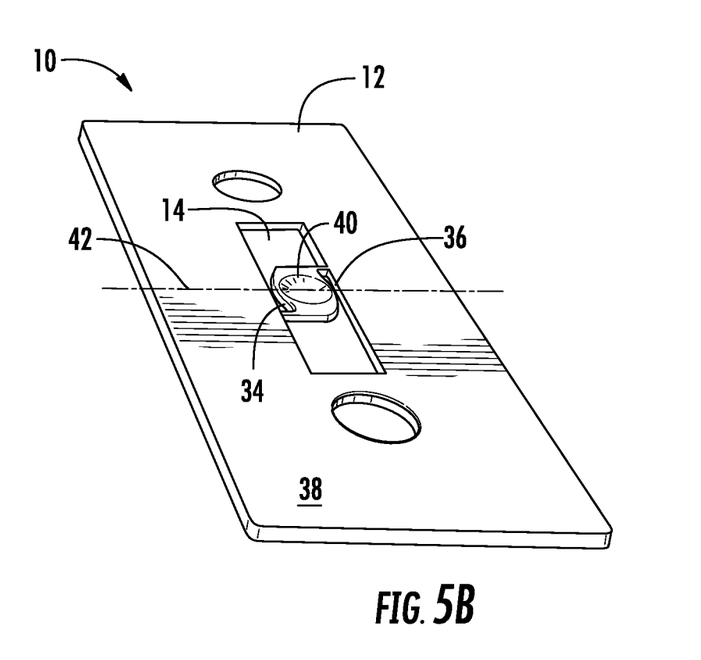

In some embodiments, to create a connector assembly 10 having one of the configurations discussed herein, plate member 12 and bushing 20 can be formed from a single piece of sheet stock. Specifically, for example, FIGS. 5A and 5B illustrate exemplary steps in the formation of connector assembly 10 according to one embodiment. Referring to FIG. 5A, first and second parallel slits 34 and 36 can be formed in a blank 38 to begin to define the portion of blank 38 that can serve as bushing 20. Specifically, for example, as show in FIG. 5A, first and second slits 34 and 36 can be placed substantially medially in blank 38, although those having skill in the art will recognize that the particular location of the slits can be selected to correspond to the desired eventual location of slot 14.

The formation of connector assembly can further include forming a depression 40 in an area substantially between first and second slits 34 and 36. Depression 40 can further define the portion of blank 38 that can serve as bushing 20, although a connector opening need not be formed at the same time. In addition, the forming of depression 40 can displace the material of blank 38 so that first and second slits 34 and 36 grow narrower along a center line 42 of depression 40. As will be discussed below, this narrowing of first and second slits 34 and 36 can advantageously help retain bushing 20 within slot 14, even after first and second tabs 22 and 24 are broken.

With the portion of blank 38 that can serve as bushing 20 substantially defined by one or more of first and second slits 34 and 36 and/or depression 40, slot 14 can be formed by removing material from blank 38 beginning from first and second slits 34 and 36 and proceeding for a predetermined length and width away from depression 40. In some embodiments, this removal of material can be controlled such that first and second tabs 22 and 24 are left intact, wherein the portion of blank 38 having depression 40 is maintained in contact with the rest of blank 38. Finally, fastener center opening 28 can be formed through depression 40, whereby bushing 20 can thus be formed.

The above method can be applied to a blank having any of a variety of material thicknesses. That being said, in some embodiments, depending on the particular process by which material is removed from blank 38 (e.g., for the formation of first and second slits 34 and 36), it can be difficult to achieve the desired sizes of one or more of the openings in blank 38 for greater thicknesses of blank 38. Specifically, for example, where blank 38 comprises a sheet of steel or other metal, one way to form first and second slits 34 and 36 can be to use a metal punch. For increasing thicknesses of blank 38, however, wider punches may be needed to penetrate the entire thickness of blank 38. As noted above, though, it can be desirable for first and second slits 34 and 36 to be as narrow as possible to help retain bushing 20 within slot 14. In addition, a narrow slit can help to reduce lateral motion of the connected building element (e.g., a wall stud) with respect to the anchorage point of connector assembly 10.

Figure 6A:
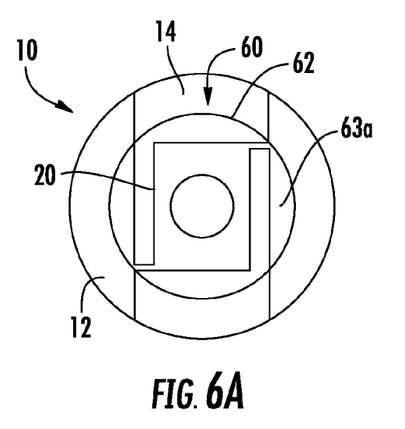
FIGS. 6A and 6B are top views of a bushing element in a connected and disconnected relationship, respectively, with respect to a surrounding connector assembly structure.
Figure 6B:
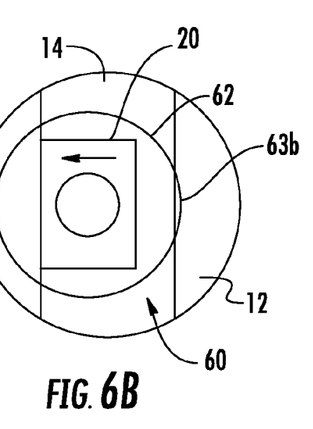

Furthermore, in conventional building practices, special fasteners with oversized heads are often not considered desirable for economic and practical reasons, and thus a "standard" screw can be preferred to be used in coupling connector assembly 10 to an associated building element. Referring to FIGS. 6A and 6B, for example, a fastener 60 having a head portion 62 can be coupled with bushing 20 (i.e., to connect connector assembly 10 to another building element). Fastener 60 is shown in phantom in FIGS. 6A and 6B so that the underlying structure can be clearly seen. When bushing 20 is in an attached state with respect to plate member 12 as shown in FIG. 6A, bushing 20 can be substantially aligned at or near the center of slot 14. In this arrangement, head 62 of fastener 60 extends over the entire width of slot 14 and overlaps with plate member 12 by a first overlap region 63a.

In situations in which bushing 20 breaks away from plate member 12, however, the amount that head 62 overlaps plate member 12 can be reduced to a second overlap region 63b. To maintain secure coupling of fastener 60 with connector assembly 10, this second overlap region 63b should be sufficiently large that loads that are expected to be imparted between head 62 and plate member 12 can be supported. In some embodiments, for example, second overlap region 63b is sized to be greater than the material thickness of plate member 12. As noted above, because it can be preferable in many situations for fastener to be a standard size, controlling the size of second overlap region 63b thus involves controlling one or more of the width of slot 14, the width of bushing 20, or the width of first and second slits 34 and 36. In some configurations, head 62 can often be only marginally larger than the width of slot 14, and thus any substantial movement of bushing 20 to one side of slot 14 (See, e.g., FIG. 6B) can result in second overlap region 63b becoming too small to support the expected loads. As a result, it can be advantageous for first and second slits 34 and 36 to be as small as possible so that lateral motion of the connected building element does not allow one side of head 62 to disengage from plate member 12.

To address this issue, the formation of bushing 20 can involve narrowing the width of first and second slits 34 and 36 after their formation. Specifically, for example, as discussed above, the formation of depression 40 between first and second slits 34 and 36 can cause material to be displaced into first and second slits 34 and 36, thereby narrowing the distance between bushing 20 and first and second edges 16 and 18 of slot 14. Alternatively or in addition, as shown in FIGS. 4A and 4B, one or more depressions or dimples 50 can be formed at or near the edges of the portion of blank 38 that defines bushing 20 to further displace material into first and second slits 34 and 36. In this way, one or more bulges 52 that protrude from at least one edge of bushing 20 into first and second slits 34 and 36 can be formed. In some embodiments, bulges 52 can extend substantially the entire distance across a respective one of first or second slits 34 or 36 such that bulges 52 contact a respective one of first or second edges 16 or 18 of slot 14. For instance, such a configuration can create the frictional engagement discussed above with respect to the embodiment illustrated in FIG. 4B.

Figure 7:
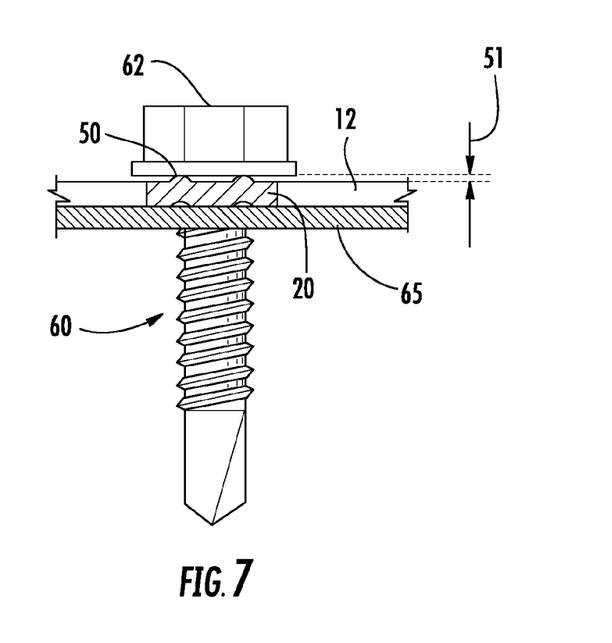
FIG. 7 is a side view of a connector assembly coupled to a building element by a fastener.

In addition, dimples 50 can further serve to keep the head of an assembly screw away from contact with the surface of plate member 12. Specifically, for example, as shown in FIG. 7, the fastener 60 can be inserted such that head 62 bears on a convex portion of dimples 50. This engagement with the protruding portion of dimples 50 can hold head 62 of fastener 60 away from the surface of plate member 12 by a small distance 51 (because the dimples are on the bushing, not the main clip surface). Alternatively or in addition, other features of connector assembly 10 can provide such an offset between the head of an assembly screw and the surface of plate member 12. In some embodiments, for example, the edges of center opening 28 can be cupped either away or toward the screw head. In other embodiments, a recessed or protruding ring can be provided around center opening 28, where the edge of center opening 28 is flat and a recessed or protruded ring is provided a small distance outside the diameter. In yet further embodiments, the edges of bushing 20 can be bent either away or toward the screw head.

Regardless of how this offset is produced, the resulting spacing allows fastener 60 to be physically tightened to join connector assembly 10 with a building element 65 without rigidly engaging fastener 60 with plate member 12 directly, which can thereby allow building element 65 to be movable with respect to plate member 12. In contrast, in competitive products without such a configuration for a bushing, the fastener must be loosened after assembly to allow such movement. Such loosening is an extra installation step, and further makes it possible for the fastener to work its way loose over time.

Figure 8A:
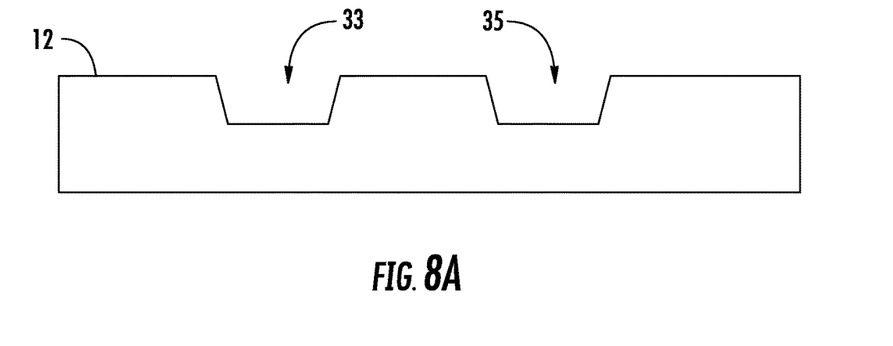
FIGS. 8A and 8B are side cutaway views of steps in a process for creating bushing elements of vertical deflection connectors according to an embodiment of the presently disclosed subject matter.
Figure 8B:
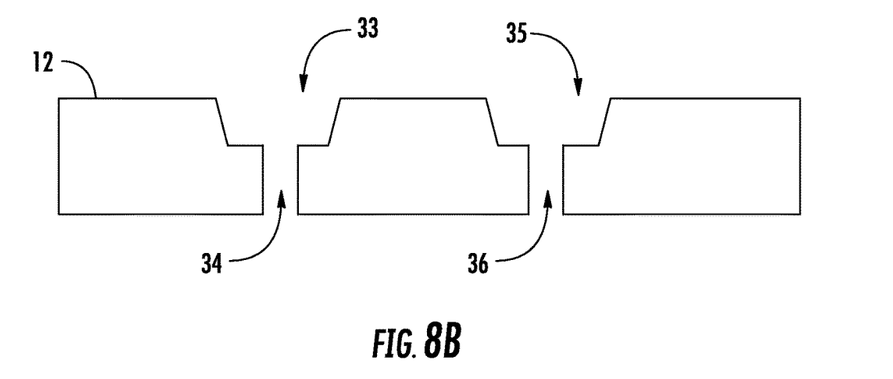

Alternatively, the size of first and second slits 34 and 36 can be controlled at their formation by using a multi-step process. As illustrated in FIGS. 8A and 8B, for example, rather than sizing first and second slits 34 and 36 based on the size of a metal punch that can penetrate through the entire thickness of blank 38, a first and second indentation 33 and 35 can be made at or around the area in which first and second slits 34 and 36, respectively, are desired. (See, e.g., FIG. 8A) Then, a second, narrower punch can be used to penetrate the now narrower thickness of blank 38 within first and second indentation 33 and 35. In other words, the final width of first and second slits 34 and 36 can be determined by the size of the tooling needed to penetrate the narrowed thickness within first and second indentations 33 and 35 rather than what is needed to penetrate the entire thickness of blank 38.

Furthermore, in addition to narrowing the width of first and second slits 34 and 36, the process steps discussed above can also serve to strengthen the material of one or both of plate member 12 and/or bushing 20. Specifically, the formation of one or more of depression 40, dimples 50, or first and second indentations 33 and 35 can plastically deform the material surrounding these features at or near the edges of plate member 12 and/or bushing 20. Those having skill in the art will recognize that such plastic deformation can improve the material strength of these elements at those locations through work hardening.

Accordingly, this improvement in the material strength can be applied to the formation of connector assembly 10 in areas other than those involving the formation of first and second slits 34 and 36. Specifically, for example, FIG. 2 illustrates an embodiment in which substantially the entireties of first edge 16 and second edge 18 of slot 14 are deformed. Because first and second edges 16 and 18 are those portions of plate member 12 that engage bushing 20 when lateral loads are applied between the connected building elements, improving the strength of first and second edges 16 and 18 can correspondingly improve the strength of connector assembly 10 when exposed to such conditions. In addition, those having skill in the art will appreciate that such work hardening of other edges and interfaces of connector assembly 10 can provide further benefits to the strength of connector assembly 10.

Further in this regard, other features on a building element such as connector assembly 10 can similarly be modified by work hardening to improve the strength of the elements. Specifically, for example, for a fastener-receiving opening in such a building element (e.g., for connector assembly 10. fastener center opening 28 or the other openings shown in FIGS. 1A and 1B), the formation of such an opening can be accomplished by pressing and punching the area around which the opening is to be formed and substantially removing the material to form the opening. In some embodiments, the amount of work hardening that is applied can be controlled to achieve a desirable balance between the loss of material thickness and the improvement in the strength of the surrounding material resulting from the work hardening. Those having ordinary skill in the art should also recognize that this concept can be applied to any of a variety of connector elements for use in connecting building elements composed of any of a variety of construction materials (e.g., wood, steel) and is not necessarily limited to applications involving the connector assemblies that are particularly disclosed herein.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A connecting member for use in building assembly comprising:
   a substantially rigid plate having one or more elongated slots formed therein; and
   a bushing coupled to the plate at an initial position within each of the one or more slots but movable relative to the plate within a respective one of the one or more slots upon application of a force exceeding a predetermined threshold value;
   wherein the bushing has a width that is substantially similar to a width of the respective one of the one or more slots;
   wherein the bushing is coupled to the plate by friction; and
   wherein the predetermined threshold value comprises a force magnitude required to overcome frictional engagement of the bushing with the plate.

2. The connecting member of claim 1, wherein at least one of the one or more elongated slots comprises a first edge and a second edge along a longest dimension of a respective one of the one or more slots; and
   wherein one or both of the first edge and the second edge are work hardened.

3. The connecting member of claim 1, wherein the bushing is coupled with the plate by one or more tabs connected to the bushing and to the plate;
   wherein the predetermined threshold value comprises a force magnitude required to break the one or more tabs.

4. The connecting member of claim 1, wherein the bushing comprises one or more dimples protruding from a surface of the bushing relative to the substantially rigid plate, the one or more dimples being configured to serve as a bearing surface against which a fastener is engagable without engaging the substantially rigid plate.

5. The connecting member of claim 1, wherein the bushing comprises one or more bulges protruding from at least one edge of the bushing, each of the one or more bulges being associated with a depression formed in a surface of the bushing.

6. The connecting member of claim 5, wherein the one or more bulges protrude from the at least one edge of the bushing and contact an edge of a respective one of the one or more slots.

7. A connecting member for use in building assembly comprising:
   a substantially rigid plate having one or more elongated slots formed therein; and
   a bushing coupled to the plate at an initial position within each of the one or more slots by one or more tabs connected to the bushing and to the plate;
   wherein the bushing comprises one or more bulges protruding from at least one edge of the bushing and contact an edge of a respective one of the one or more slots;
   wherein the bushing is coupled to the plate by friction;
   wherein the bushing is movable relative to the plate within a respective one of the one or more slots upon application of a force exceeding a predetermined threshold value required to break the one or more tabs and overcome frictional engagement of the bushing with the plate.

8. The connecting member of claim 7, wherein at least one of the one or more elongated slots comprises a first edge and a second edge along a longest dimension of a respective one of the one or more slots; and
   wherein one or both of the first edge and the second edge are work hardened.

9. A method of preparing a connecting member for use in building assembly, the method comprising:
   forming a pair of substantially parallel slits in a metal blank;
   forming a depression between the substantially parallel slits;
   forming an elongated slot by removing material beginning from the substantially parallel slits for a predetermined length and width away from the depression;
   forming one or more dimples at or near one or more edges of the bushing, wherein forming the one or more dimples displaces a portion of the metal blank surrounding the respective one of the one or more dimples so that the substantially parallel slits are narrowed, wherein a portion of the metal blank surrounding each respective one of the one or more dimples is displaced across substantially an entire width of a respective one of the substantially parallel slits, wherein the portion of the metal blank contacts a portion of the metal blank on an opposite edge of a respective one of the substantially parallel slits and is coupled to the portion of the metal blank by friction; and
   forming a connector opening through the depression to form a bushing in the blank;
   wherein the bushing is coupled to the blank at an initial position within the elongated slot but is movable relative to the blank within the elongated slot upon application of a force exceeding a predetermined threshold value; and
   wherein the predetermined threshold value comprises a force magnitude required to overcome frictional engagement of the bushing with the plate.

10. A method of preparing a connecting member for use in building assembly, the method comprising:

forming a pair of substantially parallel slits in a metal blank;

forming a depression between the substantially parallel slits;

forming an elongated slot by removing material beginning from the substantially parallel slits for a predetermined length and width away from the depression; and forming a connector opening through the depression to form a bushing in the blank;

wherein the bushing is coupled to the blank at an initial position within the elongated slot but is movable relative to the blank within the elongated slot upon application of a force exceeding a predetermined threshold value; and wherein forming the pair of substantially parallel slits comprises:

forming a pair of indentations in the metal blank; and forming the pair of substantially parallel slits within the pair of indentations;

wherein a width of each of the substantially parallel slits is less than a width of a respective one of the pair of indentations.

11. The method of claim 9, wherein forming the depression displaces a portion of the metal blank surrounding the depression so that the substantially parallel slits are narrowed along a center line of the depression.

12. The method of claim 9, wherein forming the elongated slot comprises leaving intact one or more tabs connecting a portion of the metal blank containing the depression and a portion of the metal blank on an opposite edge of a respective one of the substantially parallel slits.

13. The method of claim 9, comprising deforming one or more edges of the elongated slot to work harden the one or more edges.

* * * * *